Aug. 30, 1949.  H. L. SCHWARTZ  2,480,777
WINDROWER

Filed Dec. 12, 1941  2 Sheets-Sheet 1

Inventor,
H L. SCHWARTZ.
Dick and Bailey
By Attorneys.

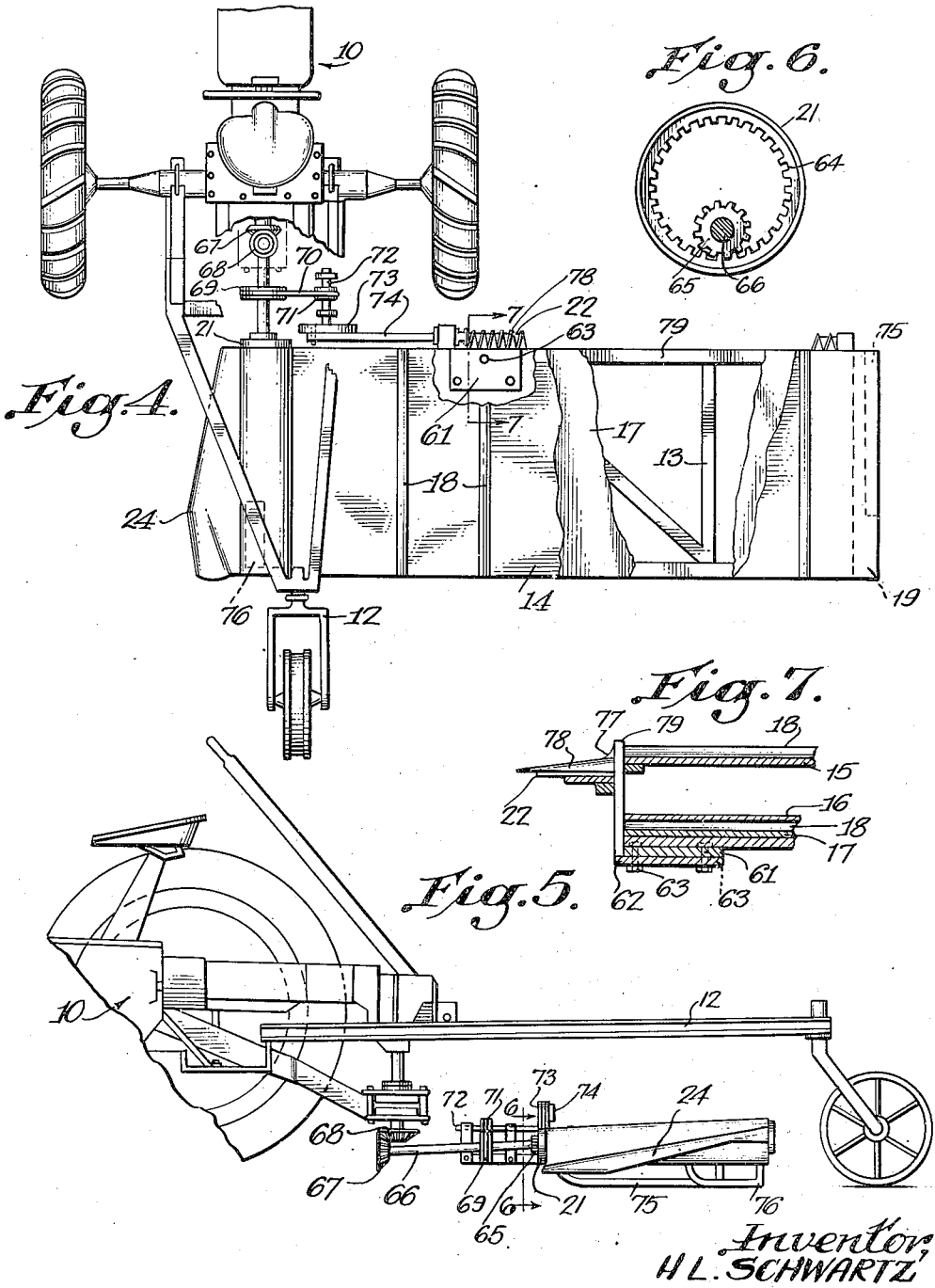

Patented Aug. 30, 1949

2,480,777

UNITED STATES PATENT OFFICE 2,480,777

WINDROWER

Henry L. Schwartz, Eagle Grove, Iowa

Application December 12, 1941, Serial No. 422,658

7 Claims. (Cl. 56—23)

This invention relates to agrarian machinery and is more specifically concerned with such machinery adapted to cut vegetation.

In recent times the practice of combining grain has become more and more popular. At first it was the practice to go over a field but once, cutting the grain and threshing it in the same general operation. Such procedure, however, has been found objectionable for a number of reasons. For one thing, the grain has no opportunity to cure after it has been cut and hence does not have the desired keeping qualities unless it is not cut until it is completely ripe. Also, when threshed immediately after cutting, unless the grain is entirely ripe, a substantial amount of the kernels go back into the field with the chaff and straw due to the fact that the joints which connect them with the straw are not sufficiently brittle to be broken until they have had an opportunity to dry out. It is impractical to leave the grain uncut until it is entirely ripe for when this is done all of the farmer's grain should be cut at once, which is obviously impossible with a single machine. Also, when entirely ripe, a substantial loss is experienced in kernels of grain shaking loose and falling, eventually, into the field. The tendency of late has been toward cutting the grain and laying it into windrows on the field. After it has had an opportunity to cure and dry out to a substantial extent, a process which under normal conditions requires from a half a day to two days and a half, a combine is used to pick it up from the windrow and thresh it.

A few devices have been provided for cutting the grain and placing it in windrows, but none of these have proven entirely satisfactory for one reason or another. For one thing, these machines are disposed behind the tractor or other propelling mechanism, where it is inconvenient for the operator to supervise their functioning. Also their general constructions have in each instance been such as to make them not entirely acceptable for the task for which they were devised. Many farmers use binders from which they have removed the knotter or both the knotter and elevating aprons but these do not function with a high degree of satisfaction for they drop the grain where it is likely to be passed over by the tractor wheels; if the elevators are not removed the grain is also dropped from such a height as to loosen many of the kernels.

It is an object of this invention to provide a windrower which avoids the objections to windrowers heretofore available.

Another object of this invention is to provide a windrower which discharges its cut substantially to one side of the swath.

Another object of this invention is to provide a windrower which deposits the grain laden stems on the field in such a position that their heads are higher than their butt ends.

Another object of this invention is to provide a windrower adapted to be disposed forward of a tractor.

A further object of this invention is to provide a windrower attachment adapted to be mounted upon a power driven mower frame structure.

A still further object of this invention is to provide a novel construction for controlling the position in which the grain laden stems are deposited upon the field.

Still other objects of my invention are to provide a novel process for harvesting grain and a novel process for depositing cut, grain laden stems in a field.

In general my invention in its preferred form consists of a cutter bar having positioned behind it a conveyer apron which is extended beyond said cutter bar at one end and which is elevated somewhat at said extended end. Adjacent the extended end of the apron a metal sheet properly formed and supported is provided for guiding the grain laden stems to the ground.

In order that a clear and concise understanding of my invention may be had reference should be made to the accompanying drawing forming a part of this specification, in which Fig. 1 is a front elevation of a structure illustrating one application of my invention, the front wind guard being omitted in order to more clearly reveal the construction.

Fig. 4 is a top plan view of a device embodying another form of my invention or rather illustrating another adaptation thereof.

Fig. 5 is an end elevation of the construction shown in Fig. 4.

Fig. 6 is a view, partially in cross-section, taken on the line 6—6 of Fig. 5.

Fig. 7 is a cross-sectional view taken on line 7—7 of Fig. 4.

Figure 1:
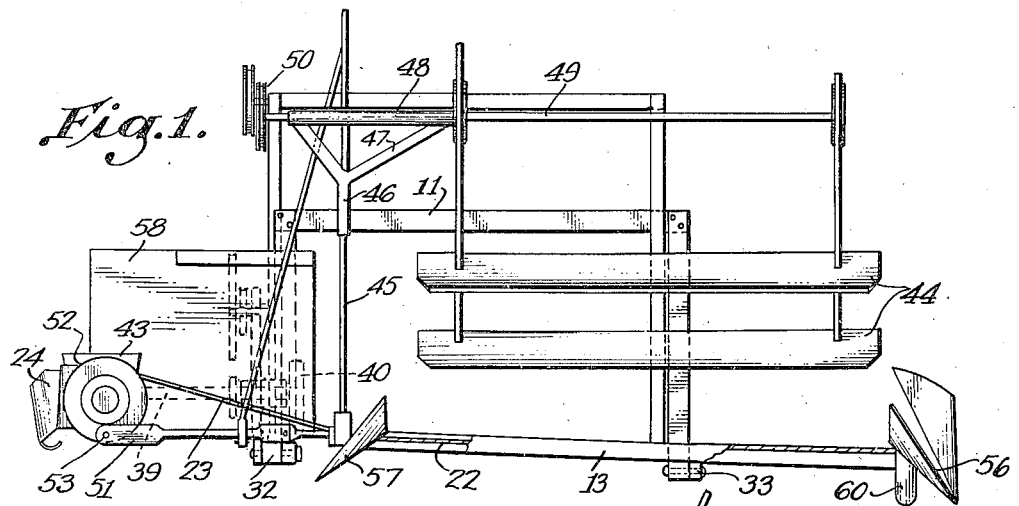

Referring now more specifically to the drawings I have used the reference character 10 to designate a farm tractor in conjunction with which I have shown my invention for illustrative purposes. The numeral 11 is a hanger structure which supports my windrower in the adaptation depicted in Figs. 1–3 and 12 designates generally a power mower frame used as a mounting for my device in Figs. 4–7. Any suitable horizontal rectangular frame work 13 (Fig. 4) is provided to carry an endless canvas 14 having a top fold 15 and a lower fold 16 (Fig. 7). A broad metal shield 17 disposed beneath the lower fold 16 protects the canvas from being worn by the abrasive stubble as the windrower travels about the field. The slats 18 supply the canvas 14 with transverse rigidity. An idling roll (see Fig. 4) 19 provided at one end of the frame 13 and a driven power roll 20 (in the structure illustrated in Figs. 1–3) and 21 (in the combination shown in Figs. 4–7) at the other end of the frame structure mount and propel the endless canvas 14, whereby grain laden stems falling upon said canvas are transported to one end of the frame 13. Suitable sickle structure 22 for cutting the grain is provided along a portion of the forward edge of the said frame 13. As appears clearly in Fig. 1 the top fold 15 of the canvas 14 slopes upwardly commencing substantially at the point at which the sickle ceases and continuing to the crest of the power roll. This incline has been designated by the reference character 23. The discharge end of the canvas 14 is inclined also slightly toward the sickle side of the frame, as is apparent in Fig. 2. After leaving the discharge end of the apron 14 the cut grain falls upon a sheet metal member 24 from which it falls to the field. The sheet metal member 24, which may be of similar design in both applications of my invention illustrated, is shown in detail in its preferred form in Fig. 3. That end 25, the forward end, of said sheet metal member 24 which is adjacent to that side of the frame 13 along which the sickle 22 is mounted, that is, which is adjacent the forward edge of the conveyor, extends outwardly only a short distance from the adjacent roll 20, or 21. The opposite or trailing end of the member 24 designated by the reference character 26, on the other hand, at its outermost point, is spaced substantially from the said discharge roll. The inner edge of the member 24 is attached to or mounted, directly or indirectly, on the frame structure 13 by any suitable means. The outer or free longitudinal edge portion of said member 24 is rolled and/or bent, curled, downwardly and inwardly as at 27, 28, and 29; it is at least in part by this expedient that the variation in the widths of the ends 25 and 26 is procured. The outermost portion of the member 24 relative to the adjacent roll 20 or 21 is at 30, the width of said member decreasing along its length in each direction from that juncture. Preferably the decrease in width is comparatively continuous and gradual until the ends of the member are reached; however, it may be more abrupt at some points than others; such a condition is apparent at 31. It will be observed from the drawing that 30 is located nearer one end of 24 and that the taper toward the proximate or adjacent end and that toward the remote end from this point are each afforded by the said curling of the free longitudinal edge which begins at a point disposed adjacent but inwardly somewhat from 30 and spaced substantially from the mounting edge and extends from said point to the said adjacent or trailing end and to a point spaced from but a lesser distance from the mounting edge and also extends from said point to the remote or forward end and to a point spaced a still lesser distance from the mounting edge and in fact disposed relatively adjacent said mounting edge. As shown in Fig. 3 it is desirable, although not absolutely essential that the end 26 of the member 24 be elevated above the end 25 and it is preferable that said end 26 be higher than the lower edge of the roll 20 or roll 21, as the case may be. Similarly the point at which the curling begins, which is adjacent the free longitudinal edge by virtue of being adjacent to 30 and which is nearer end 26, is elevated above the end 25 and the mounting edge.

Figure 2:
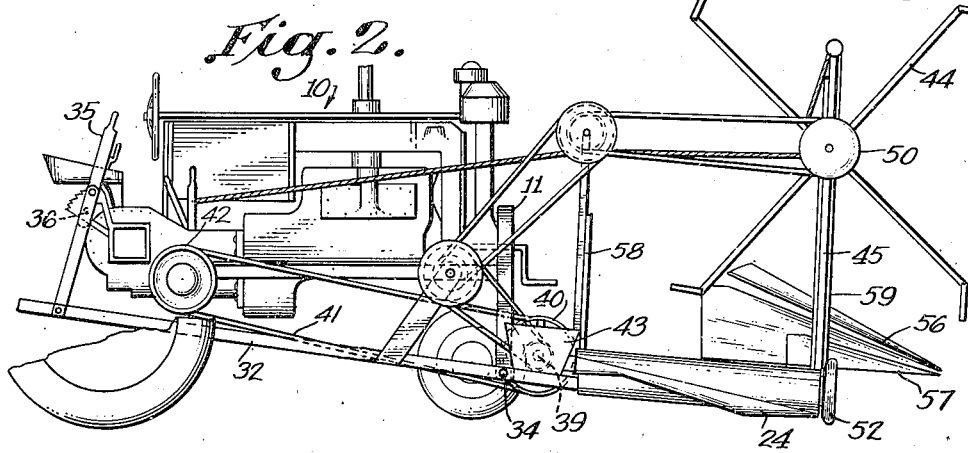
Fig. 2 is an end elevation of the device shown in Fig. 1 depicting the same mounted upon a farm tractor.
Figure 3:
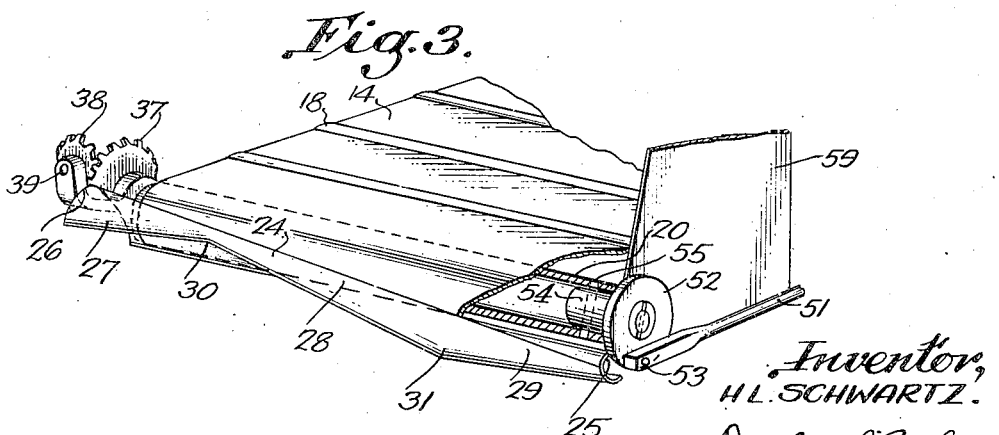
Fig. 3 is an enlarged detail perspective view of a portion of the structure in Figs. 1 and 2, showing the discharge end of the device, a part being broken away to reveal the internal arrangement.

In the construction shown in Figs. 1–3, the frame 13 is supported upon the beam members 32 and 33, which are in turn supported by means of pivotal mountings such as at 34 upon the hanger 11. The rear ends of the beams 32 and 33 are operatively connected to suitable levers such as 35 appropriately mounted as at 36 adjacent the operator and adapted to vary the position of rotation of the rear ends of the beams 32 and 33 about their pivots on the hanger 11 thus providing means for controlling the elevation of the frame 13. The roll 20 is driven by the bevel gears 37 and 38 or by other suitable means. The shaft 39 which drives the gear wheel 38 is itself driven by the pulley 40 operatively connected by means of the belt 41 to the power take-off pulley 42 of the tractor 10. In Fig. 2 a gear box 43 is shown covering the gears 37 and 38 and adjacent parts. The reel 44 which is optional, may be driven from the shaft 39 through any suitable power train adapted to properly reduce its speed of rotation. In the drawing the reel 44 is shown as supported upon the vertical pole 45 which carries the sleeve 46 upon which the bracket 47 is mounted. The bracket 47 supports a horizontal sleeve 48 which rotatably receives the reel shaft 49 to the end of which the sheave 50 is locked. The sleeve 46 is longitudinally slidable upon the pole 45 thus providing vertical adjustment for the reel. The sickle 22 is reciprocated by the pitman 51 rotatably attached to the disc 52 at an off-center point such as 53. The disc 52 is rotated by the roll 20 through the stub shaft 54, locked to said roll 20 by the pin 55. Guides 56 and 57 may be provided at each end of the sickle 22 for directing the uncut vegetation into the said sickle. If desired wind-breaks 58 and 59 may be installed adjacent the discharge end of my device for preventing the cut vegetation from being blown about while travelling up the incline 23. The shoe or runner 60 is optional but if included it is not intended to continuously engage the ground or to normally carry any substantial load. Its purpose is primarily to guide the windrower up over brief rises in the field. Of course, if desired, the runner 60 may be designed to normally engage the ground and to carry a portion of the load. In some instances it is found expedient to employ more than one runner and to mount them at various junctures on the frame 13.

In Figs. 4–7 the frame 13 is provided with a plate 61 adapted to be mounted upon the mounting plate 62 of the power mower frame 12 thus providing the principal support for the frame 13 and connected structure. Bolts 63 or other suitable means received in registering holes in the plates 61 and 62 serve to attach said plates rigidly together. The power mower frame 12 may be of any type, the plate 61 being formed to conform to the mounting plate of the particular mower frame being employed. Of course it is not inherent in my invention that a power mower frame be employed as the supporting construction. Any suitable support may be substituted. I have shown the power roll 21 as equipped with an external gear 64 (Fig. 6) adapted to engage the gear 65 which is locked to the shaft 66 having at its other end the mitre gear 67. The mitre gear 67 is operatively connected to the power take-off of the tractor through the mitre gear 68. Keyed to the shaft 66 is a sheave 69 which drives a belt 70 which, through the sheave 71, drives the shaft 72 on which the disc 73 is mounted. The pitman 74 which drives the sickle 22 is rotatably attached at its other end to an off-center point on the disc 73. In this adaptation of my invention I have found it quite desirable to provide shoes or runners on the under side of the frame 13 as at 75 and 76. These runners 75 and 76 are preferably adapted to normally carry a portion of the weight of my device. The reference character 77 (Fig. 7) designates an inclined guide strip disposed along the top of the guard structure 78 of the sickle 22 and extending substantially to the top of the forward frame member 79 of the frame 13. This construction is preferably employed in both adaptations of my invention shown herein. Its purpose is to assist in directing the cut vegetation over the top of the member 79 and onto the top fold 15 of the canvas 14.

In operation my invention functions substantially as follows: As the device moves forward across a field, the vegetation is cut by the sickle 22 whereupon it falls backward onto the top fold 15 of the canvas 14 which moves into a position beneath it as it falls. The canvas 14, driven by the power roll 20 or 21 as the case may be, carries the cut vegetation up the incline 23 to the crest of the power roll. Upon reaching the crest of the said power roll or shortly thereafter, the vegetation leaves the canvas 14 and travels onto the sheet metal member 24 from which it proceeds to the field. The member 24 being narrow at its end which is adjacent the sickle side of the frame 13, the butt ends of the vegetation leave the said member 24 and fall to the field a very short time after coming into contact with said member. The tendency is for the forward movement of the butt ends of the vegetation to be halted by the stubble in the field when said butt ends leave said member 24 and engage said stubble. The tops of the vegetation being yet supported on the wider portions of the member 24 tend to continue their forward movement after the butts have come into engagement with the stubble and being at a higher lever than the butts the stems of vegetation are driven into the stubble somewhat, at an angle to the horizontal, and when the tops are finally forced from the member 24 the tendency is for them to be supported on the field in an elevated position relative to that of the butts. Also there is a tendency for the forward thrust of the member 24 to place the heads in a more elevated position relative to their butts for since the tendency is for the butts to be held against forward motion by the stubble, this forward thrust applied to the stems tends to rotate the heads upwardly about their butts. Some of the foregoing description of the procedure which occurs after the vegetation has reached the member 24 is theory and is recited solely for the purpose of stating my explanation of the results accomplished by my windrower, namely, placement of the vegetation on the field in such a position that the heads are elevated. Naturally, I do not wish to be limited by these theories.

In practicing my novel process of gathering vegetation, I cut the vegetation, deposit it upon the field in such a position that at least a high percentage of the tops are elevated relative to their butts, and subsequently pick up the vegetation from the field preferably, but not necessarily, after it has had an opportunity to cure for a period. I may pursue the following steps in depositing the vegetation upon the field: Lower at least a high percentage of the butt ends into contact with the field while their tops are yet otherwise supported in a position above the field, apply a generally horizontally directed force to said vegetation after the said butts are in contact with the field and while the said tops are still in a supported position above the field, and withdraw the support for said heads. The generally horizontally directed force may be applied to the vegetation at any suitable point or points but it is preferably applied in the central or upper sections. Obviously certain variations and eliminations may be made in my novel processes and it is not necessary that my novel process for depositing cut vegetation on a field be the one employed in my novel process for gathering vegetation. It is not essential that the vegetation be picked up from the field subsequent to being deposited there with a large percentage of its heads elevated relative to their butts. Again it is not necessary that the tops be supported until the butts contact the field. The entire stems may be released above the field at substantially the same time but with the heads at a more elevated position than the butts. Neither is it imperative that a generally horizontally directed force be applied to the vegetation, and if applied, it is not absolutely prerequisite that the tops be independently supported above the field at the time of its applictaion. Commonly I employ the same means for supporting the tops above the field as I use for transmitting the horizontal force to the vegetation.

In addition to the mountings for my novel windrower described specifically herein, any other suitable mounting may be employed including independent supporting wheel structure adapted also to drive the working parts of my device. While it is preferable that the apron 14 be inclined slightly toward the sickle side of the windrower as is shown in Figs. 2 and 5, such construction is by no means essential. Any suitable conveying device may replace the endless apron and the discharge may occur elsewhere than at an end of the device and/or adjacent the roll which drives the said apron. It is not positively essential that the conveyor be elevated at its discharge end or that a guard such as the sheet 17 be employed for protecting the apron from the field stubble. Either or both of the wind breaks 58 and 59 may be altered or eliminated and any suitable means for driving the sickle may be employed. The grain guides 56 and 57 and various shoes or runners are optional, as is also the reel 44 together with its connections. The beam members 32 and 33, if employed, need not be pivotally mounted to provide means for adjusting the height of the windrower. The inclined strip 77 is not necessary for a satisfactory operation of my invention. Other cutting means may be substituted for the sickle and guard structure shown. The precise design, size, and shape of the member 24 may be widely varied and it is not at all inherent that said member be sheet metal or that it be rolled. For example, it may be a substantially flat piece of wood or other material suitably shaped and/or mounted to provide a restricted area in that portion thereof which normally receives the butts of the vegetation and a wider expanse where the tops and/or central portions of the stems of vegetation contact. It may be tapered from one end to another rather than each way from an intermediate point. It is not positively prerequisite that the member 24 or its substitute be narrower in certain parts provided it is elevated in those portions which support the upper parts of the stems of vegetation. Conversely, a reasonably workable device may be secured by providing said member with a restricted area adjacent the butts of the vegetation even though no portion thereof be elevated above another. As a matter of fact the member 24 may be eliminated entirely if the conveyor structure be so formed as to release the butts ahead of their upper portions or if it be so formed as to release the upper portions at a higher level than the butts or both. Again, the desired result may be secured by providing a deflector or other suitable device for arranging the vegetation on the conveyor in such a manner that its butt ends will be released first. The drive of the conveyor may be variously placed. While it is preferable that in the application shown in Figs. 4–7 the construction be such that as many of the power mower parts as possible be employed in conjunction with my device including the cutter drive connections, such is not required. Neither is it inherent in my invention that the conveyor extend beyond the end of the cutting means; however, such is preferable in that it provides opportunity for elevating the vegetation and also it facilitates moving the vegetation out of line of the traction wheels of a vehicle used in connection with my device.

My device may be used in connection with cutting and handling various forms of vegetation.

As used in the ensuing claims the term "field" is intended to include standing stubble, and the term "heads" to include those portions of the stems of vegetation upward of the butt end portions. "Member" may include several parts.

The advantage afforded by my device is illustrated by the fact that grain cut and windrowed in the morning of a day by a machine embodying my invention may be threshed in the afternoon of the same day provided weather conditions are favorable. At least one of the reasons for such being true is the fact that my device leaves the heads of the stems of grain partially upstanding in the field, thus affording excellent opportunity for air and sunlight to reach them.

While I have described an embodiment of my invention and certain modifications thereof for illustrative purposes, one skilled in the art will be able to make alterations and eliminations in the precise constructions mentioned and this without departing from the true spirit and scope of my invention. I wish therefore to be limited herein only by the appended claims.

I claim:

1. A discharge platform for a windrower comprising a horizontal discharge conveyor and an elongated sheet of material supportingly mounted along one of its longitudinal edges adjacent the discharge end of the conveyor, said sheet sloping upwardly from its supporting edge to a point on its free edge nearer one end and being curled downwardly along its free longitudinal edge from said point to the proximate end and to a point spaced from the mounting edge, and from said point to the remote end and to a point adjacent the mounting edge.

2. A discharge platform for a windrower comprising a generally horizontal discharge conveyor and an elongated sheet of material supportingly mounted along one of its longitudinal edges adjacent the discharge end of the conveyor, said sheet sloping upwardly from its mounting edge to a point adjacent its free edge and nearer one of its ends and being curled downwardly along its free longitudinal edge from said point to the proximate end and to a point spaced from the mounting edge, and from said point to the remote end and to a point more adjacent the mounting edge.

3. A discharge platform for a windrower comprising a generally horizontal discharge conveyor and an elongated sheet of material supportingly mounted along one of its longitudinal edges adjacent the discharge end of the conveyor, said sheet sloping upwardly from its mounting edge to a point adjacent its free edge and nearer one of its ends and being curled downwardly along its free longitudinal edge from said point to the remote end and to a point adjacent the mounting edge, the arrangement being such that said remote end is the forward end of the elongated sheet with reference to the direction of travel of the windrower.

4. A discharge platform for a windrower comprising an elongated sheet of material designed to be supportingly mounted along one of its longitudinal edges in a generally horizontal position and which, when so mounted, slopes upwardly from its mounting edge to a point adjacent its free edge and nearer one of its ends and is curled downwardly along its free longitudinal edge from said point to the remote end and to a point adjacent the mounting edge, the arrangement being such that said remote end is the forward end of the elongated sheet with reference to the direction of travel of the windrower.

5. A discharge platform for a windrower comprising a conveyor having a grain receiving portion which is horizontal in its direction of travel and having a discharge portion which is slightly inclined upwardly in its direction of travel, an endless apron embracing both of said conveyor portions, the arrangement being such that the butt ends of grain carried by said apron over said conveyor portions are disposed along one edge of the conveyor, and an elongated sheet of material supportingly mounted along one of its longitudinal edges adjacent the discharge end of the said discharge portion of the conveyor, said sheet sloping upwardly from its mounting edge to a point adjacent its free edge and nearer one of its ends and being curled downwardly along its free longitudinal edge from said point to the proximate end and to a point spaced from the mounting edge, and from said point to the remote end and to a point more adjacent the mounting edge, the construction being such that said remote end is disposed adjacent that edge of the conveyor along which the butts of the grain travel.

6. A vegetation handling assembly for a windrower comprising a generally horizontally disposed conveyor and an elongated sheet of material supportingly mounted along one of its longitudinal edges adjacent the discharge end of said conveyor, said sheet sloping upwardly from that one of its ends which is disposed adjacent to the forward edge of said conveyor and having its free longitudinal edge curled downwardly from a point located nearer its opposite end and spaced substantially from said mounting edge to the said opposite end and to a point spaced a lesser distance from said mounting edge and also having its free longitudinal edge curled downwardly from said first point to the said first end and to a point spaced a still lesser distance from said mounting edge.

7. A discharge platform for a windrower comprising an elongated sheet of material designed to be supportingly mounted along one of its longitudinal edges in a generally horizontal position and which, when so mounted, slopes upwardly from its forward end and has its free longitudinal edge curled downwardly from a point located nearer its trailing end and spaced substantially from said mounting edge to the said trailing end and to a point spaced a lesser distance from said mounting edge and which also has its free longitudinal edge curled downwardly from said first point to the said forward end and to a point spaced a still lesser distance from said mounting edge.

HENRY L. SCHWARTZ.

REFERENCES CITED

The following references are of record in the file of this patent:

UNITED STATES PATENTS

| Number | Name | Date |
|---|---|---|
| 18,638 | Hardeman | Nov. 17, 1857 |
| 21,940 | Burson | Nov. 2, 1858 |
| 37,392 | Esterly | Jan. 13, 1863 |
| 38,626 | Embree | May 19, 1863 |
| 75,103 | Wrenn | Mar. 3, 1868 |
| 251,845 | Dunkel et al. | Jan. 3, 1882 |
| 418,141 | Schaeffer | Dec. 24, 1889 |
| 885,157 | Hovland | Apr. 21, 1908 |
| 1,748,559 | Raney et al. | Feb. 25, 1930 |
| 1,823,387 | Campbell | Sept. 15, 1931 |
| 1,905,410 | Innes | Apr. 25, 1933 |
| 1,906,498 | Templeton | May 2, 1933 |
| 1,938,263 | Templeton | Dec. 5, 1933 |
| 1,938,264 | Templeton | Dec. 5, 1933 |
| 1,958,910 | Christiansen | May 15, 1934 |
| 2,071,844 | Korsmo | Feb. 23, 1937 |